July 24, 1956  V. R. F. J. LAFOSSE  2,755,561
AIR SPIRIT LEVELS

Filed Oct. 4, 1954  2 Sheets-Sheet 1

INVENTOR.
VICTOR RICHARD FERNAND JEAN LAFOSSE
BY
Young, Emery & Thompson
ATTYS.

July 24, 1956     V. R. F. J. LAFOSSE     2,755,561
AIR SPIRIT LEVELS
Filed Oct. 4, 1954     2 Sheets-Sheet 2
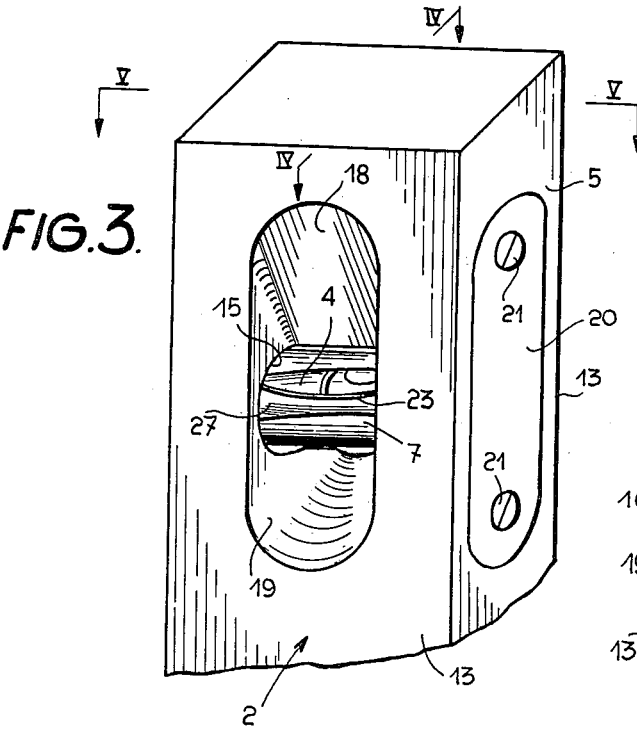
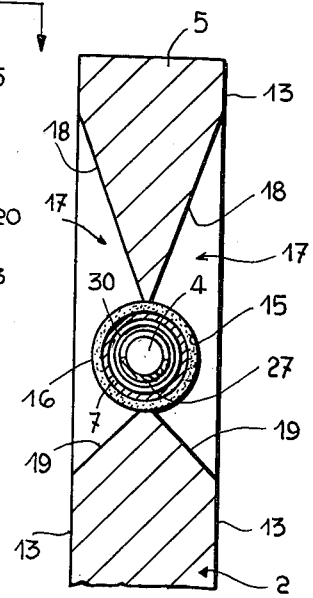
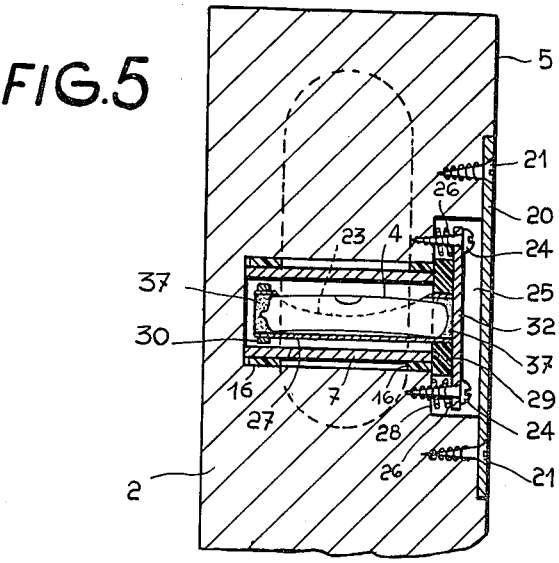
INVENTOR.
VICTOR RICHARD FERNAND JEAN LAFOSSE
BY
Young, Emery & Thompson
ATTYS.

2,755,561

AIR SPIRIT LEVELS

Victor Richard Fernand Jean Lafosse,
Kortenberg, Belgium

Application October 4, 1954, Serial No. 460,183

Claims priority, application Belgium October 10, 1953

6 Claims. (Cl. 33—211)

The present invention relates to improvements in air spirit levels of the type comprising a ruler or a body, in which is provided at least one recess serving to accommodate a sealed vial of glass or of a similar transparent material, partially filled with an appropriate liquid.

In known air spirit levels, the vial, which consists of a fragile tube closed at both its ends, is protected by at least one plate, preferably of metal, which serves to close the said recess and which is provided with a window, possibly provided with glass, to allow the user to see the air bubble and to prevent the access of dust and other foreign bodies to the vial.

Known air spirit levels of the above described type present several disadvantages. Thus, the protection of the vial, ensured by the plates provided with windows, is only moderate. It often happens that the windows in question break, as a result of the shocks to which the level is submitted, which allows the access of dust and other foreign bodies to the vial, to such an extent that the visibility of the bubble is altered, whilst the vial itself runs the risk of being broken during rough handling of the level. What is more, the illumination of the vial, in known levels of the type described above, is often defective, the access of the light to the vial being obscured by the plates and other non-transparent accessories which close the recess provided in the ruler. Finally, the thin plates and other abovementioned accessories also prevent the proper viewing of the bubble in certain positions of the level.

It is true, that it has already been proposed to protect the vials of air spirit levels by means of a protective piece of a transparent plastic material. The surface of these pieces is easily scratched or marked, which alters the visibility of the bubble. Furthermore, these pieces are not very strong.

The present invention has as its object to remedy the abovementioned disadvantages and has as object air spirit levels, equipped with simple and less costly means, ensuring an effective protection of the vial under the most strenuous conditions of handling, both against the breaking of the vial and the access of dust or other foreign bodies thereto, said means providing, in addition, perfect visibility of the air bubble in all possible positions of the level.

According to the invention, the sealed vial is freely surrounded by a protective casing in glass or a similar transparent material, this casing being resiliently supported in the recess, disposed in the ruler and serving to house the vial.

By the expression "protective casing," as it is employed in the present specification, is meant a piece of glass or of a like transparent material, which surrounds the vial entirely or partially along its periphery in a plane substantially perpendicular to the axis of the vial. Thus, the protective casing in question can be a sleeve or a semi-sleeve of circular, polygonal or other cross-section.

According to a preferred embodiment of the invention, the vial in question is supported, at both its ends or in the region of its two ends, by a piece of deformable resilient material. This piece can comprise a disc of a shape appropriate to that of the recess, such that it can easily be kept in place therein, this disc being provided with an opening permitting the passage of one end of the protective casing. Thus, the casing can, under the effect of the knocks or shocks, displace itself independently of the vial, the deformable resilient material, of which the discs or support blocks are made, undergoing a compression as a result of which the shocks or knocks in question are deadened.

According to a preferred embodiment of the invention, the vial extends substantially coaxially to the protective casing and the relation of the cross-section of the vial to the cross-section of the protective casing is such that the vial remains out of contact with the protective casing, in all possible relative positions of the vial and the protective casing.

The protective casing of glass or of a like transparent material is, preferably, of circular cross-section, but it can also be of another cross-section, namely of an elliptical, rectangular, square, or even polygonal cross-section.

As to the support members, they are, preferably, comprised of blocks or of discs of sponge rubber. Instead of sponge rubber, use can of course be made of any other material having similar elastically deformable qualities. Instead of support pieces of sponge rubber or of a similar material, use can also be made of springs disposed, for example, around each end of the protective casing, in such a manner as to ensure an elastic suspension of the latter around the vial, which occupies a fixed position with regard to the ruler.

In the case where the ruler has, as is usually the case, a rectangular cross-section and in the case where the recess serving to house the vial is disposed in one of the small longitudinal faces of the ruler, provision is made, according to a further feature of the invention, for shortening the lateral walls of the recess which correspond to the two large longitudinal faces of the ruler, over at least a part of the height of the recess, starting from the said small longitudinal face of the ruler, in such a manner that the protective casing is visible, in an uninterrupted manner, over at least half of its periphery.

The invention is likewise concerned with an air spirit level of the type comprising a body or a ruler, in which is disposed a recess serving to house a sealed vial of glass or of a like transparent material, partially filled with an appropriate liquid, the said recess being in communication with openings disposed in the opposing faces of the ruler. Known levels of the type described above have the disadvantage of only allowing the viewing of the vial at a reduced angle. The use of a protective casing, such as specified above permits this disadvantage to be partially overcome, but to ensure a proper visibility of the vial, in all possible positions of the level, it is arranged, according to a further feature of the invention, that the edges of the openings provided in the opposing faces of the ruler are inclined towards the said recess, more or less in a direction perpendicular to the axis of the vial. In the type of air spirit level serving, owing to the arrangement described above, for verifying whether surfaces are vertical, the edges of the openings communicating with the recess, in which the vial is housed perpendicularly to the longitudinal direction of the ruler, are preferably, inclined in this longitudinal direction. This inclination is, preferably, variable. Therefore, as will appear later from the present specification, it is advantageous that the edge of the said openings, which is situated in the region of the extremity of the ruler, is slightly inclined towards the recess in question, whereas the edge opposite said openings, that is to say the edge furthest removed from the extremity of the ruler, can be greatly inclined towards the said recess.

Other features and details of the invention will appear from the description of the accompanying drawings, which show diagrammatically, and by way of example only, two embodiments of an air spirit level according to the invention.

In these drawings:

Figure 3 is a perspective view of a portion of an air spirit level according to the invention, serving to verify whether surfaces are vertical;

Figure 4 is a section along the plane shown by the lines IV—IV of Figure 3, and

Figure 5 is a section along the plane shown by the lines V—V of Figure 3.

In these various figures, the same reference numerals indicate similar parts.

Figure 1:
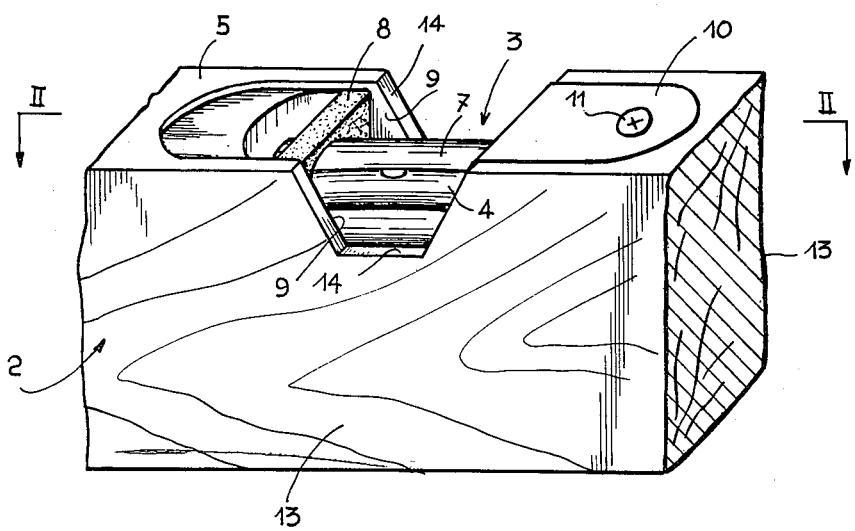
Figure 1 is a perspective view of a portion of an air spirit level according to the invention, serving to verify the horizontal level of surfaces.
Figure 2:
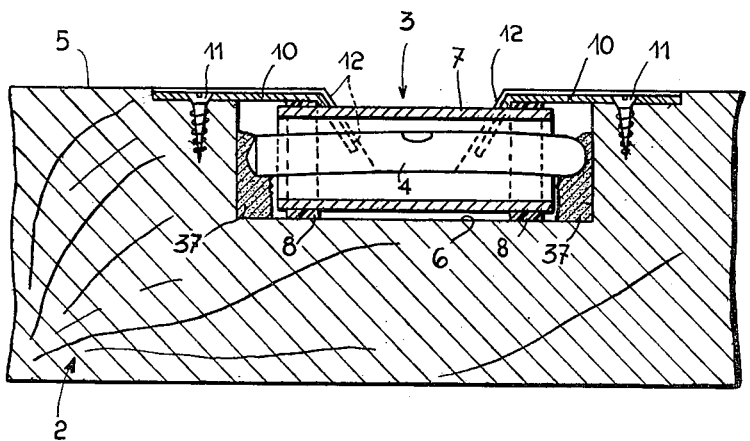
Figure 2 is a section along the plane shown by the lines II—II of Figure 1.

In Figures 1 and 2, there is shown a part of an air spirit level, comprising essentially a body, generally in the shape of a ruler 2 of rectangular cross-section, for example of wood, aluminium, steel or any other appropriate material, and a recess 3 serving to house a sealed vial 4 of glass or a like transparent material, partly filled with an appropriate liquid, such as water, alcohol, ether, etc. As shown in Figure 1, the recess 3 is formed in a small longitudinal face 5 of the ruler 2. In the embodiment of the invention shown in Figures 1 and 2, the vial 4 is fixed to the bottom 6 of the recess 3, by having its ends sealed in plaster 37 or a like fixing agent. It is evident that instead of being fixed in this manner to the bottom of the recess 3, the vial can be fixed there, in an adjustable manner, as in the embodiment of the invention shown in Figures 3 to 5.

The vial 4 passes freely through a protective casing 7 of glass or a similar transparent material, the said casing being resiliently supported in the recess 3. In the embodiment shown, by way of example, in the accompanying drawings, the protective casing 7 of circular cross-section is resiliently supported, in the region of each of its ends, by blocks 8 of sponge rubber, or of another elastically deformable material. In these blocks are provided apertures the diameter of which corresponds to the outer diameter of the protective casing 7, so that the casing is more or less wedged in the blocks in question. The blocks 8 are of rectangular shape and rest on the bottom 6 of the recess 3, against the lateral walls 9 thereof and against the closure plates 10 fixed by a screw 11 to the ruler 2. The dimensions of the blocks 8 are chosen in such a manner that these blocks are wedged along their circumference in the recess 3, in such a manner as to prevent dust from entering by the open ends of the protective casing 7.

The closure plates 10 have an inclined part 12, the free end of which follows the shape of the protective casing 7.

The protective casing extends substantially coaxially to the vial 4 and the cross-section of the casing 7 is such, with respect to the cross-section of the vial 4, that the said casing can never come into contact with the vial 4, even if, under the effect of a violent blow or a shock, the protective casing experiences an appreciable displacement, this displacement being possible owing to the elastically deformable support blocks 8.

Tests have shown that the protection given by the casing 7 is very effective. Thus, when this casing has a wall thickness of 2 millimeters, hammer blows can be applied to it without it breaking. The hammer blows are deadened by the elastically deformable support blocks 8, which allow the protective casing 7 to become displaced parallel to its axis. In addition, the support blocks 8 also prevent axial displacements of the protective casing 7, in the case where the blows or shocks are applied to the ruler 2 in the longitudinal direction thereof.

In Figure 1, it can be seen that the large longitudinal faces 13 are cut at 14, in such a manner as to allow a continuous visibility of the vial 4 over a very wide angle. The cuts 14 stretch from the longitudinal face 5 of the ruler 2 to a level situated well below the vial 4.

In Figures 3 to 5, another embodiment of the invention is shown, as applied to a water level serving to verify the vertical inclination of surfaces. In this embodiment, the vial 4, supported by a cradle 27, is housed in a recess 15 provided in the region of one of the ends of the ruler 2. The vial 4 is surrounded by a protective casing 7, supported by rings 16 of sponge rubber or of a like elastically deformable material. The vial 4 and the protective casing extend perpendicularly to the longitudinal direction of the ruler 2.

The recess 15 is in communication with openings 17 disposed in the large longitudinal faces 13 of the ruler. As shown in Figure 3 the openings 17 are elongated and their cross-section greatly exceeds that of the openings, generally circular, provided in known types of air spirit levels. Figures 3 and 4 show that the edges of the openings 17 are inclined towards the recess 15, in a direction perpendicular to the axis of vial 4. In practice, it has been found that the edge 18 of the openings 17, which is situated in the region of the end of the ruler 2, can be slightly inclined towards the recess 15. Owing to this arrangement, the user can see the vial 4, without having to bend, in cases where the vertical inclination of a surface situated at a level lower than the user is being verified.

As regards the edge 19 of the openings 17, which is situated opposite the edge 18, this is more inclined towards the recess 15, the cradle generally limiting the visibility of the vial on the side 19 of the openings 17.

It is evident that the slope of the edges 18 and 19 of the openings 17 may be the same.

In Figure 5 there is shown in greater detail the mounting of the vial 4 and the protective casing in the recess 15. The recess 15 is closed on a small longitudinal face 5 of the ruler 2 by a closure plate 20 fixed to the ruler 2 by screws 21. In a housing 25 provided under the closure plate 20 is a small plate 32, which is connected to the cradle 27 to which the vial 4 is fixed. The cradle 27 is cut away laterally, as shown at 23. At the free end of the cradle the latter is surrounded by a ring 30 of rubber or of a like material, this ring serves to avoid contact between the metal of the cradle and the interior wall of the protective casing 7. The position of the small plate 32 and of the cradle 27 supporting the vial 4 is adjustable, by means of two screws 24 engaging in the bottom 28 of the housing 25. Between the bottom 28 of this housing 25 and the small plate 32, the screws 24 are surrounded by a small spring 26, whilst a rubber ring 29 surrounds the cradle 27 which likewise abuts against the bottom 28 of the housing 25. Around the cradle 27 and at a certain distance therefrom the protective casing 7 extends and it carries adjacent both ends, support rings 16 of sponge rubber or of another elastically deformable material.

It is apparent that the device shown in Figures 3 to 5 can be provided on an air spirit level also constructed according to Figures 1 and 2.

It is evident that the invention is not limited to the embodiments described above and that various modifications can be applied to the device, to the structure and the shape of certain elements used in its assembly, providing that these modifications are not in contradiction with the scope of the following claims.

What I claim is:

1. An air spirit level comprising a ruler or body, a recess in said ruler or body, a sealed vial of glass or like transparent material housed in said recess and partially filled with an appropriate liquid, and a continuous protective casing of glass or like transparent material freely surrounding the vial and spaced from said vial without any connection between the vial and the protective casing, said protective casing being resiliently supported in said recess.

2. An air spirit level comprising a ruler or body, a recess in said ruler or body, a sealed vial of glass or like transparent material directly fixed at both its ends to the ruler or body in said recess and partially filled with an appropriate liquid, and a continuous protective casing of glass or like transparent material freely surrounding the vial and spaced from said vial without any connection between the vial and the protective casing, said protective casing being resiliently supported in said recess.

3. An air spirit level comprising a ruler or body, a recess in said ruler or body, a sealed vial of glass or like transparent material directly fixed at both its ends to the ruler or body in said recess and partially filled with an appropriate liquid, a continuous protective casing of glass or like transparent material freely surrounding the vial and spaced from said vial without any connection between the vial and the protective casing, and members made of an elastically deformable material supporting said protective casing at both its ends in said recess.

4. An air spirit level comprising a ruler or body, a recess in said ruler or body, a sealed vial of glass or like transparent material directly fixed at both its ends to the ruler or body in said recess and partially filled with an appropriate liquid, a continuous protective casing of glass or like transparent material freely surrounding the vial and spaced from said vial without any connection between the vial and the protective casing, and supporting members made of an elastically deformable material, in which the protective casing is inserted at both its ends in said recess.

5. An air spirit level comprising a ruler or body, a recess in said ruler or body, a sealed vial of glass or like transparent material directly fixed at both its ends to the ruler or body in said recess and partially filled with an appropriate liquid, a continuous protective casing of glass or like transparent material freely surrounding the vial and spaced from said vial without any connection between the vial and the protective casing, and two spaced blocks made of an elastically deformable material, said blocks supporting the protective casing in said recess and having each a hole therein, through which passes one end of the protective casing.

6. An air spirit level comprising a ruler or body, a recess in said ruler or body, a sealed vial of glass or like transparent material in said recess and partially filled with an appropriate liquid, a continuous tubular protective casing of glass or like transparent material freely surrounding the vial and spaced from said vial without any connection between the vial and the protective casing, said protective casing being resiliently supported in said recess and being open at both its ends so that the vial extends freely therethrough and is fixed at both its ends directly to the ruler or body, outside of the protective casing.

References Cited in the file of this patent

UNITED STATES PATENTS

| | | |
|---|---|---|
| 236,282 | Vaughn | Jan. 4, 1881 |
| 915,274 | Day | Mar. 16, 1909 |
| 1,082,163 | Lung | Dec. 23, 1913 |